United States Patent

Basso et al.

[11] Patent Number: 6,104,715

[45] Date of Patent: Aug. 15, 2000

[54] MERGING OF DATA CELLS IN AN ATM NETWORK

[75] Inventors: Claude Basso, Nice, France; Richard H. Boivie, Monroe, Conn.; Jean L. Calvignac, Cary, N.C.; Douglas Dykeman, Richterswil, Switzerland; Daniel Orsatti, La Gaude, France; Robert A. Sultan, Katonah, N.Y.; Fabrice J. Verplanken, La Gaude, France

[73] Assignee: International Business Machines Corporation, Armonk, N.Y.

[21] Appl. No.: 08/974,285

[22] Filed: Nov. 19, 1997

Related U.S. Application Data

[60] Provisional application No. 60/044,994, Apr. 28, 1997.

[51] Int. Cl.[7] .................................................... H04L 12/56
[52] U.S. Cl. ............................................................... 370/397
[58] Field of Search ................................... 370/395, 396, 370/397, 399, 400, 409, 466, 474, 476

[56] References Cited

U.S. PATENT DOCUMENTS

| | | | |
|---|---|---|---|
| 5,483,525 | 1/1996 | Song et al. ............................ | 370/60 |
| 5,526,351 | 6/1996 | Mochinaga et al. .................... | 370/399 |
| 5,627,836 | 5/1997 | Conoscenti et al. .................... | 370/397 |
| 5,689,499 | 11/1997 | Hullett et al. .......................... | 370/235 |
| 5,867,499 | 2/1999 | Yunten .................................. | 370/397 |
| 5,878,045 | 3/1999 | Timbs ................................... | 370/466 |
| 5,905,729 | 5/1999 | Gaddis et al. ......................... | 370/399 |
| 5,946,313 | 8/1999 | Allan et al. ........................... | 370/397 |

*Primary Examiner*—Min Jung

[57] ABSTRACT

This invention relates to the merging of data cells arriving at an Asynchronous Transfer Mode (ATM) switching node from data frames originating with a number of senders. As is standard in ATM networks, each originating frame is segmented into a series of cells each having Virtual Path Identifier (VPI) and a Virtual Channel Identifier (VCI) in its header portion. On arrival at each switching node, the VCI of the first cell of a frame is overwritten by a new outgoing VCI value that is used for all other cells of the frame. Thus, the actual movement of each cell through the network is controlled only by the cell's VPI, whereas the VCI field is used only to distinguish frames from each other. A feature of the invention is that it can accommodate Early Packet Discard in a simple way by associated any discard indication determined for a frame with the outgoing VCI value which also applies to all cells of the entire frame.

10 Claims, 3 Drawing Sheets

Fig. 4A

Port Table

| In Key | Data |
|---|---|
| PN1 | Indirect |
| PN2 | Direct |
| PN3 | Indirect |
| ⋮ | ⋮ |

Fig. 4B

Direct Sender VCI Table

| In Key | Data |
|---|---|
| PN1, VPI1 | VCI 1 |
| PN1, VPI2 | VCI 2 |
| PN1, VPI3 | VCI 3 |
| PN2, VPI1 | VCI 4 |
| PN2, VPI2 | VCI 5 |
| ⋮ | ⋮ |

Fig. 4C

Indirect/Switch VCI Table

| In Key | Data |
|---|---|
| PN1, VCI1 | VCI 1 |
| PN1, VCI2 | VCI 2 |
| PN2, VCI1 | VCI 3 |
| ⋮ | ⋮ |

MERGING OF DATA CELLS IN AN ATM NETWORK

CROSS-REFERENCE TO RELATED APPLICATIONS

The present application claims priority to co-pending U.S. provisional application Ser. No. 60/044,994, filed Apr. 28, 1997.

BACKGROUND OF THE INVENTION

1. Field of the Invention

An Asynchronous Transfer Mode (henceforth ATM) network has switching points or "nodes" for transmission of data among senders and receivers connected to the network. The "switching" performed by these switching points is in fact the action of passing on a "cell" of data received by a switching point or node to a further node in the network. Such switching actions are the means by which communication data is moved through the ATM network.

The present invention relates to a method and apparatus for merging data received at a node from a number of senders in an ATM network.

The ATM system has a broadly accepted set of standards which ensure compatibility of ATM networks and their components. The book "Asynchronous Transfer Mode (ATM)-Technical Overview", by Harry J. R. Dutton and Peter Lenhard, 2nd Edition, published by Prentice Hall, ISBN 0-13-52044-5, can be consulted in order to gain familiarity with the ATM system.

The following explanations and descriptions help define the some basic characteristics of ATM communication:

All digital communication packets or "frames" are converted or segmented at a sender into cells (henceforth simply "cells"). These cells are transferred through the ATM network via a transmission medium.

Each cell has a fixed data length. For example, in the ATM standard each cell consists of a 5-byte header and a 48-byte information field. One part of the header carries data which is termed a "Virtual Path Identifier" (henceforth the "VPI"). Another part of the header carries data termed a "Virtual Channel Identifier" (henceforth the "VCI").

FIG. 1 (prior art) illustrates the parts of the header recognized as belonging to the VPI and VCI.

The path to be followed by a cell through an ATM network is defined by a series of "look-up tables" which are typically contained in storage devices in the switching points or nodes of the network. These look-up tables contain routing information to be consulted when a cell arrives at the switch point.

The ATM network has some switching points called "Virtual Channel Switches". A "Virtual Channel Link" is the link between two successive virtual channel switches in the ATM network. A "Virtual Channel Connection" (VCC) is a route through the ATM network consisting of a particular set of virtual channel links. An example of such a virtual channel connection is the route from the point of origin of a communication in the ATM network via two or more virtual channel links to the destination of the communication in the ATM network. It should be clearly understood that the virtual channel "connection" here refers to a route through the ATM network and not to the action of making a connection.

A switching action performed at a virtual channel switch in the ATM network is made in dependence on the data in both the VPI and VCI fields of the cell's header.

The ATM network also has some switching points called "Virtual Path Switches". A "Virtual Path Link" is the link between two successive virtual path switches in the ATM network. There may be several virtual path switches within one virtual channel link. The "Virtual Path Connection" (VPC) is the route through several virtual path switches followed by a particular cell.

A switching action performed at a virtual path switch in the ATM network is made in dependence on only the data in the VPI field of the cell's header. In short, a VPI bundles several VCIS.

It may instructive for an accurate understanding of the current invention to review the function of the look-up tables stored at the switching points:

A cell, segmented from a frame originating at a sender, starts as its entry point into the ATM network with a certain value stored in the VPI data field in its header. When the cell reaches the first virtual path switch, this switch reads the VPI in the header.

The value of the VPI is now used either directly or indirectly as a key to derive the address located in the look-up table held in the storage of the virtual path switch. The data value found at that particular address in the look-up table is then put into the cell's header in place of the original VPI. The particular exit port from the virtual path switch out of which the cell is to be sent is also determined by a value stored at the same address in the look-up table. The cell is now sent from the first virtual path switch further through the ATM network, having had its VPI value changed by the virtual path switch. At each subsequent virtual path switch in the virtual path connection a similar switching action to this takes place, i.e. the value of the VPI in the cell on arrival at the switch is accessed in the look-up table, and the value stored in the look-up table under that address is inserted into the VPI data field in the cell's header prior to sending the cell further through the network. Thus the values stored in the look-up tables at the various switching points determine the cell's route through the ATM network.

Although the VPI value can be used as the address in the look-up table, other arrangements for finding a particular entry in the table may be contemplated. It is only important that the VPI value of the incoming cell reliably leads to the location of the stored information which tells the virtual path switch how to direct that cell to the next node within the ATM network.

By definition, all cells having the same incoming VPI are switched together at a virtual path switch, i.e. they are all sent on with the same outgoing VPI independently of their VCI value. Therefore several cells with different values of VCI may follow the same virtual path connection. Thus the virtual path connection can be considered to be effectively a bundle of virtual channel connections.

In general, there will be one particular look-up table in the virtual path switch for each input port to the switch. Therefore a cell arriving at the switch at one particular input port with one particular VPI value in its header will not necessarily be sent out on the same output port as a cell with the same VPI value which arrives at the same virtual path switch on a different input port.

The switching action performed at a virtual channel switch involves consulting a look-up table which has entries accessed according to the value of the VPI and VCI data fields together. Comparing the possible number of VP addresses (2\*\*12=4096) and of VC addresses (2\*\*16—65, 536), it is obvious that a VC switch requires larger look-up tables and thus vastly more memory space as a VP switch in the same network.

There is in fact nothing in the ATM standard which prevents one switching point or node in the ATM network acting as both a virtual path switch and a virtual channel switch (i.e. as dual function nodes).

The ATM standards for the VPI and VCI are given in "CCITT Recommendations I. 361 and 363".

ATM switching technology is also disclosed in numerous patents and patent applications. U.S. Pat. No. 5,239,537 for example describes means and methods to substitute a corrupted VP by an alternate VP. The U.S. Pat. No. 5,271,010 to Miyake describes a converter for converting the VPI and a VCI, i.e., the full 28 bit address attached to the header of an ATM cell.

2. Description of the Prior Art

There have been several recent submissions describing schemes for merging ATM traffic from multiple senders on a single ATM node or connection point.

ATM Forum draft 97-xxxx, 1997 entitled "Support for Routers in an ATM Network", by Douglas Dykeman et al., describes the use of merged connections to support routing in ATM networks.

Merging requires a method to insure that cells from different senders can be properly reassembled into frames at the receiver. As suggested in ATM Forum draft 97-0261, 1997, entitled "Multipoint to Point Vcs", by Juha Heinanen, a key environment for such merged connections is AAL5/UBR. As will be understood by those skilled in the art, AAL5 is a network service class of ATM Adaptation Layer (AAL), while UBR refers to a best effort level of service where data can be discarded if congestion is encountered.

Merge Alternatives Overview Merge schemes can be broadly classed as Frame-Based or Cell-Based. In the case of Frame-Based Merge cells associated with a frame are transmitted contiguously on outbound links. The function of collecting cells for contiguous transmission may be called "pseudo-reassembly", as full AAL5 reassembly is not required. Frame-based merge offers the advantage that a merged connection appears no different than a non-merged connection from the perspective of senders and receivers. Frame-Based Merge requires modification of the switch to perform pseudo-reassembly and sufficient memory to buffer frames undergoing reassembly. It also introduces latency (the delay between transmission by the sender and receipt by the receiver) greater than that associated with cell relay.

In the case of Cell-Based Merge, cells associated with frames from different senders are interleaved <on links> at switching nodes. An identifier is required so that cells from different senders can be distinguished and reassembled into frames at the receiver. If, for example, traffic is merged on a VP connection point, a globally unique VCI value associated with each sender can be used to distinguish cells for reassembly at the receiver.

Cell-Based schemes can be further classed as static or dynamic. In static schemes, the assignment of the identifier used to distinguish cells from different senders is relatively long-lived. The assignment can be made by manual definition, distributed assignment protocol, signaling, or other means. In dynamic schemes, the identifier assignment is short-lived. In particular, a new assignment can be made for each individual frame.

Before describing the Dynamic Cell-Based Merge approach of the present invention, it is useful to review alternatives for Static Cell-Based Merge. Three alternatives are described in ATM Forum draft 97-0379, 1997, entitled "Distributed Mechanisms for VCI in VP-Based Multicast", by R. Venkateswaran et al:

1) Globally unique VCI mechanism for VP switching.

2) VCI collision avoidance using VC switching.

3) VCI collision resolution using VP-VC switching.

In the first alternative, the sender identifier is a globally unique VCI. This value can be assigned by a central server or by individual merge <points> connection nodes. In the latter case, the VCI space is partitioned among the <Merge Points> nodes. A key advantage of this scheme is that no VC resources are required in the switching nodes as only VP switching is performed. The disadvantages are necessity for a global VCI uniqueness' protocol and a limitation of 4096 on the number of VP merged connections passing through any switch (assuming the full 12-bits of VP are used). Also switches often support some form of Early Packet Discard for UBR traffic; such schemes may not work when there is no VC awareness in switches.

The second alternative avoids the requirement for globally unique identifiers by using locally unique VCI values and performing VC switching. Conceptually, there is a distinct VC from each sender to the receiver. The advantage of this scheme is that no protocol is necessary to insure global uniqueness of the identifier. Also, any traffic management performed by the switch for VC connections, will continue to work in this environment. One disadvantage of this scheme is that a sender cannot send data until signaling to establish the VC has completed. This can be contrasted to the VP switching alternative where a new sender can send data on the VP connection simply by using the unique VCI assigned to it. The authors suggest that this problem can be relieved to some extent by using controls cells to establish VC entries. A more significant disadvantage of the second scheme is the requirement for a VC table entry for each sender on a merged connection. In an environment with N receivers and N senders, a switch would require on the order of N**2 VCI table entries. Switches often have significant limitations on the number of such entries.

The third alternative is a hybrid of the first two. VP Switching is used but there is no attempt to insure that the VCI is globally unique. Instead, there is a mechanism for a merge node or point to detect that two senders using that merge point are using the same VCI value. When this collision is observed, the VC switching alternative is used on the path from the detecting merge point to the receiver.

SUMMARY OF THE INVENTION

According to the present invention, only VP switching is used to direct the flow of cells segmented from different frames which are to be merged at a switching node—because the invention uses the VC field of the cell's header for identifying cells belonging to frames from different senders. This invention describes a way of dynamically assigning VCIs to distinguish senders in a merged ATM connection. Preferably, the assignment of a locally unique VCI exists only as long as is required to switch all the cells of a single frame.

The present invention broadly provides a switching apparatus for use in an asynchronous transfer mode (ATM) network to connect a plurality of senders to a receiver for transmission of frames of data segmented into a series of cells of data, each cell having a header portion comprising a Virtual Path Identifier (VPI) and a Virtual channel Identifier (VCI), each frame comprising a first cell and a last cell in said series. The inventive switching apparatus comprising: a) a plurality of entry ports, each entry port being operable to receive cells from at least one frame at a time, b) a storage device containing a lookup table of mutually distinct VCI values for assignment to frames received at an entry port, one VCI value being assigned to one frame at a time, c) a read/write device operable for reading and retaining a VCI value from said lookup table and, beginning with the first cell of a frame received at a port, writing said VCI value over any existing VCI of each cell of only said frame until the last cell thereof is received at said port, said read/write device being operable to thereupon cause said VCI value to be released for assignment to cells of a another frame that subsequently arrives at said switching apparatus, d) a plurality of exit ports, each exit port being operable to emit cells of a plurality of frames from said switching apparatus, and e) a switch for transmitting each cell received by an entry port of said apparatus to an exit port according to the VPI of said each cell.

For use of the switching apparatus at positions in an ATM network to receive frames directly from senders, the storage device contains a lookup table having a set of lookup keys that identify both an entry port for a cell received at said switching apparatus and an incoming VPI for the cell, and wherein the data content of the lookup table comprises one of the aforesaid set of mutually distinct VCI values.

Where, however, the switching apparatus at positions in an ATM network to receive frames indirectly from senders through one or more switching nodes, the storage device contains a second lookup table which has a set of lookup keys that identify both an entry port for a cell received at the switching apparatus and an incoming VCI for the cell, and wherein the data content of the second lookup table comprises one of the aforesaid set of mutually distinct VCI values.

Preferably, the storage device comprises a port lookup table having lookup keys that identify an entry port for a cell received at the switching apparatus, and wherein the data content of the aforesaid port lookup table are indicators denoting whether said entry port is connected directly to a sender or indirectly through a switching node. The port lookup table may be included in the storage device along with the other two tables in order to select which of the other two tables is to be used (depending on whether the entry port is linked back to the sender or to a switching node that connects back toward the sender.

For the purpose of early packet discard, the switching apparatus preferably comprises: f) a discard determination device operable to determine whether a selected frame is to be discarded and for accordingly writing a discard identifier into the header portion when writing a VCI value from said lookup table over any existing VCI of each cell of the selected frame, and g) a discard device operable for discarding each cell having a discard identifier before that cell is transmitted to an exit port of the switching apparatus.

The invention further provides a method for use in an Asynchronous Transfer Mode (ATM) network to connect a plurality of senders through switching nodes to a receiver in order to transmit frames of data, each frame being segmented into a series of cells of data, each cell having a header portion comprising a Virtual Path Identifier (VPI) and a Virtual Channel Identifier (VCI), each frame comprising a first cell in said series, each switching node having a plurality of entry ports, exit ports, and a storage device containing a lookup table having a set of lookup keys and comprising, as data content, a set of corresponding, mutually distinct VCI values. The method comprises the steps of: a) receiving a first cell from a frame at one of said entry ports, b) looking up and retaining a VCI value from said stored lookup table and writing said VCI value over any existing VCI in the header portion of each cell of only said frame until the last cell thereof is received at said one of said entry ports, and thereupon releasing said VCI value for use with cells of another frame that is subsequently received at said switching node, and c) switching each cell received by each entry port to an exit portion according to only the VPI of said cell.

Where the method is used at nodes in an ATM network to receive frames directly from senders, the storage device contains a ("direct") lookup table having a set of lookup keys that identify both an entry port for a cell received at said switching node and an incoming VPI for the cell, and wherein the data content of said lookup table comprises one of said set of mutually distinct VCI values Where the method is used at nodes in an ATM network to receive frames indirectly from senders through other switching nodes, the storage device contains a second ("indirect") lookup table having a set of lookup keys that identify both an entry port for a cell received at the switching node and an incoming VCI for the cell, and wherein the data content of the aforesaid lookup table comprises one of the set of mutually distinct VCI values.

Preferably, the storage device contains a port lookup table, as outlined above, which can be used to choose between the direct and indirect lookup tables depending on whether the port is linked directly to a sender or to a switching node.

Early packet discard is conveniently done by: d) determining whether a selected frame is to be discarded and accordingly writing a discard identifier into the header portion when writing a VCI value from the direct or indirect lookup table over any existing VCI of each cell of said selected frame; and g) discarding each cell having a discard identifier before that cell is transmitted to an exit port of said switching node.

BRIEF DESCRIPTION OF THE DRAWINGS

The invention will be better understood with reference to the following drawings and the description of the invention contained herein:

FIG. 4 shows, in simple form, the lookup tables which are used in carrying out the invention.

DETAILED DESCRIPTION OF THE INVENTION

Figure 1:
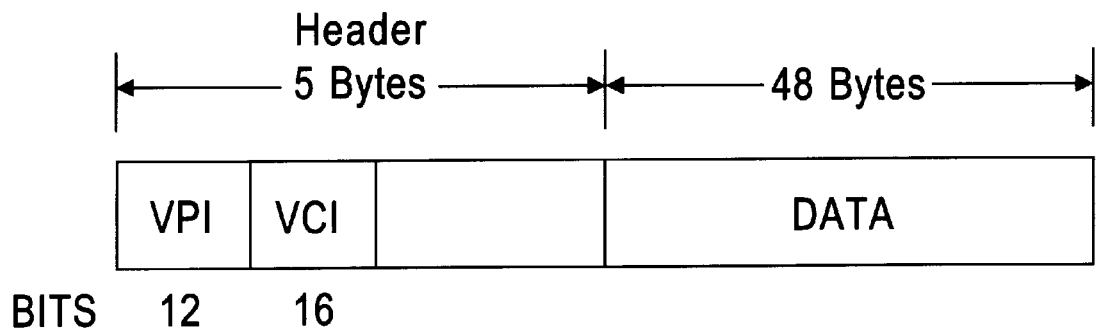
FIG. 1 is a simplified diagram of a standard prior art ATM data cells as described herein.

FIG. 1 shows a data cell formed in an ATM format with a data portion of 48 bytes and a header portion of 5 bytes. As can be seen, the header portion includes a VPI of 12 bits and a VCI of 16 bits.

Figure 2:
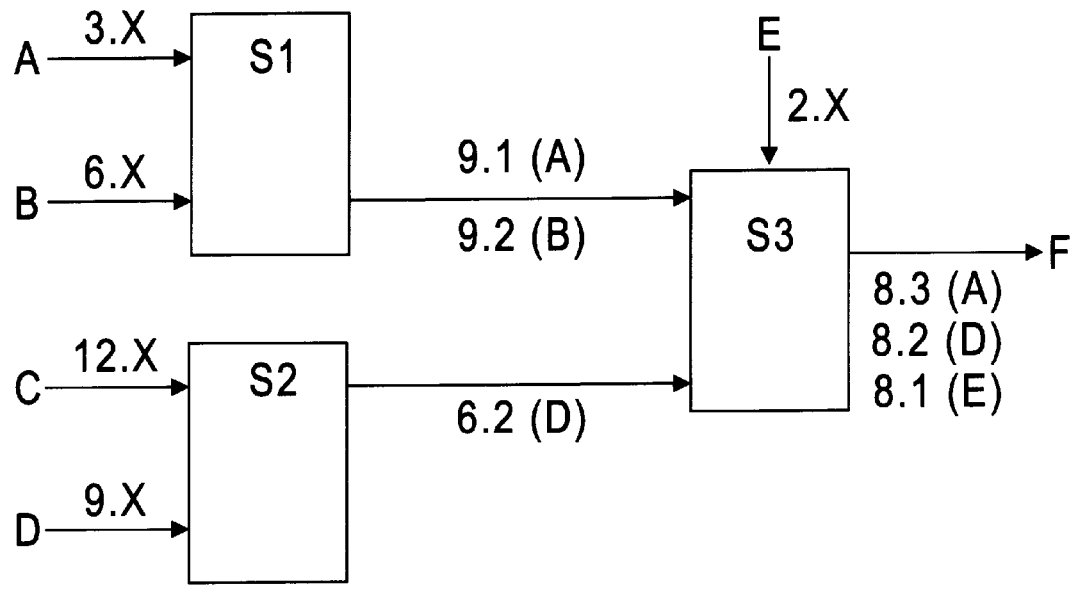
FIG. 2 is a schematic diagram of a number of senders sending data cells through switching apparatuses in accordance with an embodiment of the invention.

FIG. 2 shows a part of an ATM network in which five senders A,B,C,D and E are sending frames which are segmented into cells to receiver F through inventive switching apparatuses S1, S2 and S3. A detailed description of FIG. 2 will be provided hereinbelow as an example of the inventive method of the invention already outlined hereinabove.

Figure 3:
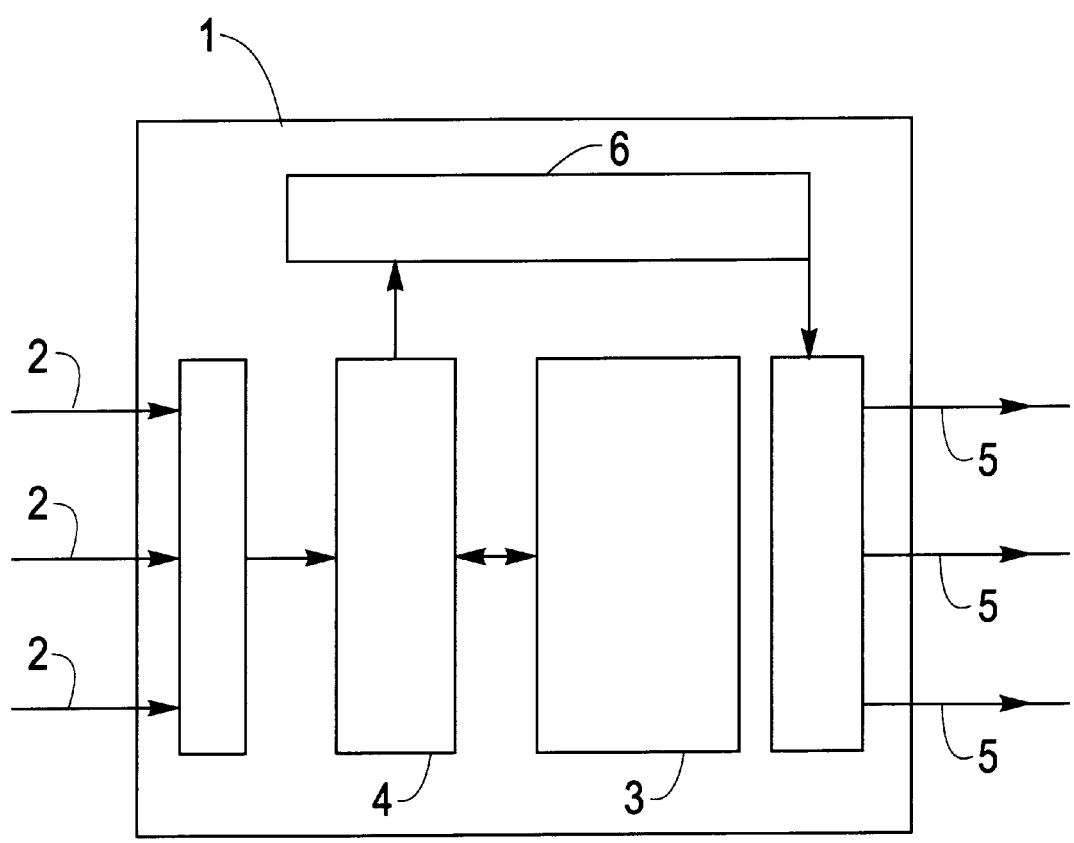
FIG. 3 is a simplified block diagram of the switching apparatus of the invention.

FIG. 3 shows a switching apparatus 1 according to the invention for use at an ATM switching node. The apparatus 1 includes entry ports 2, a storage device 3, a read/write device 4, exit ports 5, and a switch 6. Storage device 3, such as a ROM storage unit together with control circuitry, contains a lookup table which contains a set of mutually distinct VCI values.

As outlined herein, a series of cells from at least one frame (including the first and last cell of the frame) are received by entry ports 2. Read/write device 4 reads (and temporarily retains the VCI value read from being used for cells of other frames) the lookup table when the first cell of a frame is received and overwrites the VCI of that cell, and every subsequent cell of that frame, with the VCI value selected from the lookup table. After the last cell of the frame has had its VCI overwritten by the selected VCI value from the table, that value is released so it can be used again for cells of another frame that subsequently arrives at the switching apparatus 1. Once the outgoing VCI of each cell has been written over the VCI field of the cell's header portion, that cell is transmitted in a standard way by switch 6 to an exit port selected according to the VPI value of the cell.

Where the switching apparatus is connected directly to a sender, it would use a table such as depicted at (B) in FIG. 4, which uses lookup keys ("IN KEY") that identify both an entry port (PN) for the incoming cell and a VPI for that cell, whereas the data content (DATA) of the table is set of mutually distinct outgoing VCI values.

Where the switching apparatuses connected indirectly to the sender through on or more other switching nodes, the read/write device would use a lookup table such as depicted at (C) in FIG. 4, which uses lookup keys that identify both the entry port (PN) for the incoming cell and its incoming VCI, and where the data content is again the outgoing VCI value to be assigned to the cell.

Where it is desired to use the same switching apparatus in both direct-to-sender and indirect-to-sender positions in the ATM network, then the storage device 3 would contain not only lookup tables (B) and (C), but also would contain a port table. The port table, depicted at (A) in FIG. 4, uses the incoming port identifier (PN) as a key to obtain data indicating whether the direct table (B) or the indirect table (C) should be used to obtain the outgoing VCI value.

The Dynamic Cell-Based Merge scheme of this invention may also be called Dynamic VCI Assignment. In this scheme the sender identifier is a VCI value assigned locally at a switch (or switching node) each time a frame arrives at the switch. At any point in time, the number of VCI assignments required is equal to the number of frames in transit through the switch. The number is expected to be small, relative to the number of senders. The scheme, therefore, has a relatively small storage requirement, requires no protocol for identifier uniqueness or collision detection, and requires no signalling beyond that required to establish the VP connection.

This description assumes the existence of a VP connection which can carry merged traffic in the direction from "leaves" (senders) to "root" (receiver). As described in ATM Forum Draft 97-0428, 1997, entitled "VC Merge Support Using Standard Signalling and Routing", by John Drake and Joel Halpern, existing Q.2931 signaling for ATM point-to-multipoint connections can be extended to allow traffic flow from leaves to root.

As described herein, the VP switching is performed as usual, but during the activity of determining the VP of a cell, it is determined whether this VP is a merged VP (AAL5, UBR, leaves to root (i.e. reverse) traffic direction) that is to use the dynamic VCI allocation method disclosed here.

On receiving a cell, the switch determined whether frame reassembly is in progress by searching for an existing VCI assignment. At the switch immediately downstream from the sender, this search is performed at a lookup table such as (B) of FIG. 4 using PN, VPI as the key (where PN indicates port number). That is, for a specific combination of port and VPI, cells from different VCs will not be interleaved. This is a property of the segmentation (SAR) function performed by the sender.

At subsequent downstream switches in the traffic path, the search is performed at another lookup table such as (C) of FIG. 4 using PN, VCI as the key. When an upstream switch assigns a dynamic VCI value, it obtains the value from a single pool of VCI values that is shared among all of the merged VP connections. The downstream switch need only examine the port on which a cell is received and the assigned VCI value in order to uniquely identify the frame.

In the case of both (1) a switch to which the sender is directly attached and (2) subsequent downstream switches, the VCI-assignment found during the search contains the VCI value to be overwritten in the cell headers. The switch then performs the following logic:

If VCI-assignment found THEN overwrite VCI in cell header with VCI of VCI-assignment IF last-cell-in-frame THEN remove VCI-assignment from active-table return VCI-assignment to free-pool ENDIF ELSE (VCI-assignment not found) get VCI-assignment from free-pool insert VCI-assignment in active-table with key PN.VPI.VCI ENDIF Perform VP switching on cell as usual As cells travel through the switching network, each switch repeats the processing described above. Cells are marked with a VCI value that distinguishes them as belonging to a specific frame in transit.

The receiving node performs reassembly as usual, associating cells with frames according to the VPI/VCI value in the cell header. The reassembly function in the receiving node may require configuration of VCI value for which reassembly is to be performed. In this case, the number of VCI values configured should be equal to or greater than the largest number of concurrent frames that might be expected by the receiver on the merged connection.

It may be understood that the receiving cannot identify the sender by the VCI value of cells that arrive at the receiver. The VCI value is only a means for distinguishing frames from different senders.

The logic and data structures required to search for the VCI-assignment and overwrite the VCI field are similar in kind to those required for ATM switching. While modification of switching logic is required, the extension is relatively small and is similar in type to existing logic.

Dynamic VCI Assignment Example

In the example shown in FIG. 2, nodes A, B, C, D and E are senders associated with VP merged connection at switch nodes S1, S2 and S3. Node F is the receiver. Each link is marked with a VPI.VCI value. The VPI values are established via signaling and are static. The assigned VCI values apply only while the cells of a frame are in transit through a switch. The VCI value supplied by the sender node is arbitrary (denoted by the value "x"). The value is overwritten by the first downstream switch is not used by that switch.

Cells sent from sender A are switched from VPI=3 to VPI=9 at S-1 and are switched from VPI=9 to VPI=8 at S3. Cells on the link S1-S3 carry VPI/VCI 9.1 if they were sent by A, or 9.2 if the were sent by B. FIG. 2 shows that there is no frame currently in transit from sender C. That is, there is no VCI assignment marked as being associated with sender C. There is a frame from sender B that has a VCI assignment of 2 on link S1-S3, but this frame has not yet reached S3, so it is not listed among the VCI assignments associated with link S3-F.

Early Packet Discard

In the UBR environment, cells may be discarded when congestion occurs. In such cases, it is efficient to use a discard determination device to determine that the complete frame should be discarded before transmitting any cells of that frame onward from an ATM switching node. This function is known as Early Packet Discard (EPD). When it has been determined that a frame is to be dropped, a discard identifier is written into the header portion of each cell of the frame so that all cells are dropped until the end of frame.

Dynamic VCI Assignment provides a natural method for performing packet discard. The VCI-assignment obtained from lookup which contains the outgoing VCI value can also contain an indication as to whether cells associated with the frame are to be dropped. Cells can be dropped until the end of frame and then the VCI assignment removed from the active table is normal at the completion of frame transmission.

A number of features are characteristic of the Dynamic VCI Assignment (dynamic cell-based merge) of the invention +VC table entries (VCI-assignments) exists only while a frame is in transit, resulting in small storage requirement +Signaling for VP establishment only +No requirement for globally unique VCI or collision detection +Dynamic VCI assignment provides natural method for Early Packet Discard on the merged VP +Switch extension is similar to logic already existing in switch −Some switch modification is required −Number of merged VP connections passing through any switch limited to 4096

The present invention thus provides a method of merging ATM data traffic with a relatively small storage and signaling requirement. It does not impact the latency of ATM traffic and allows a natural method for Early Packet Discard on the merged VP. No global VCI assignment or collision detection/resolution protocol is required as in prior art alternatives.

What is claimed is:

1. A switching apparatus for use in an asynchronous transfer mode (ATM) network to connect a plurality of senders to a receiver for transmission of frames of data segmented into a series of cells of data, each cell having a header portion comprising a Virtual Path Identifier (VPI) and a Virtual Channel Identifier (VCI), each frame comprising a first cell and a last cell in said series, said switching apparatus comprising:

a) a plurality of entry ports, each entry port being operable to receive cells from at least one frame at a time, b) a storage device containing a lookup table of mutually distinct VCI values for assignment to frames received at an entry port, one VCI value being assigned to one frame at a time, c) a read/write device operable for reading and retaining a VCI value from said lookup table and, beginning with the first cell of a frame received at a port, writing said VCI value over any existing VCI of each cell of only said frame until the last cell thereof is received at said port, said read/write being operable to thereupon cause said VCI value to be released for assignment to cells of another frame that subsequently arrives at said switching apparatus, d) a plurality of exit ports, each exit port being operable to emit cells of a plurality of frames from said switching apparatus, and e) a switch for transmitting each cell received by an entry port of said apparatus to an exit port according to the VPI of said each cell.

2. A switching apparatus according to claim 1, wherein, for use of the switching apparatus at positions in an ATM network to receive frames directly from senders, said storage device contains a lookup table having a set of lookup keys that identify both an entry port for a cell received at said switching apparatus and an incoming VPI for the cell, and wherein the data content of said lookup table comprises one of said set of mutually distinct VCI values.

3. A switching apparatus according to claim 1, wherein, for use of the switching apparatus at positions in an ATM network to receive frames indirectly from senders through a switching node, said storage device containing a lookup table having a set of lookup keys that identify both an entry port for a cell received at said switching apparatus and an incoming VCI for the cell, and wherein the data content of said lookup table comprises one of said set of mutually distinct VCI values.

4. A switching apparatus according to claim 1, 2, or 3, wherein said storage device contains a port lookup table having lookup keys that identify an entry port for a cell received at said switching apparatus, and wherein the data content of said port lookup table are indicators denoting whether said entry port is connected directly to a sender or indirectly through a switching node.

5. A switching apparatus according to claim 1, 2, or 3, further comprising:

f) a discard determination device operable to determine whether a selected frame is to be discarded and for accordingly writing a discard identifier into the header portion when writing a VCI value from said lookup table over any existing VCI of each cell of said selected frame, and g) a discard device operable for discarding each cell having a discard identifier before said each cell is transmitted to an exit port of said switching apparatus.

6. A method for use in an Asynchronous Transfer Mode (ATM) network to connect a plurality of senders through switch nodes to a receiver in order to transmit frames of data, each frame being segmented into a series of cells of data, each cell having a header portion comprising a Virtual Path Identifier (VPI) and a Virtual Channel Identifier (VCI), each frame comprising a first cell and a last cell in said series, each switching node having a plurality of entry ports, exit ports, and a storage device containing a lookup table having a set of lookup keys and comprising, as data content, a set of corresponding, mutually distinct VCI values, said method comprising the steps of:

a) receiving a first cell from a frame at one of said entry ports, b) looking up and retaining a VCI value from said stored lookup table and writing said VCI value over any existing VCI in the header portion of each cell of only said frame until the last cell thereof is received at said one of said entry ports, and thereupon releasing said VCI value for use with cells of another frame that is subsequently received at said switching node, and c) switching each cell received by each entry port to an exit port according to only the VPI of said cell.

7. A method according to claim 6, wherein, for use of the method at nodes in an ATM network to receive frames directly from senders, said storage device contains a lookup table having a set of lookup keys that identify both an entry port for a cell received at said switching node and an incoming VPI for the cell, and wherein the data content of said lookup table comprises one of said set of mutually distinct VCI values.

8. A method according to claim 6, wherein, for use of the method at nodes in an ATM network to receive frames indirectly through other switching nodes from senders, said storage device contains a lookup table having a set of lookup keys that identify both an entry port for a cell received at said switching node and an incoming VCI for the cell, and wherein the data content of said lookup table comprises one of said set of mutually distinct VCI values.

9. A method according to claim 6, 7 or 8, wherein said storage device contains a port lookup table having lookup keys that identify an entry port for a cell received at said switching apparatus, and wherein the data content of said port lookup table are indicators denoting whether said entry port is connected directly to a sender or indirectly through a switching node.

10. A method according to claim 6, 7 or 8, further comprising the steps of:
   d) determining whether a selected frame is to be discarded and accordingly writing a discard identifier into the header portion when writing a VCI value from said lookup table over any existing VCI of each cell of said selected frame, and
   g) discarding each cell having a discard identifier before said each cell is transmitted to an exit port of said switching node.

* * * * *